No. 769,445. PATENTED SEPT. 6, 1904.
C. A. MEURELL.
BREAD FORMING MACHINE.
APPLICATION FILED MAY 5, 1904.
NO MODEL.
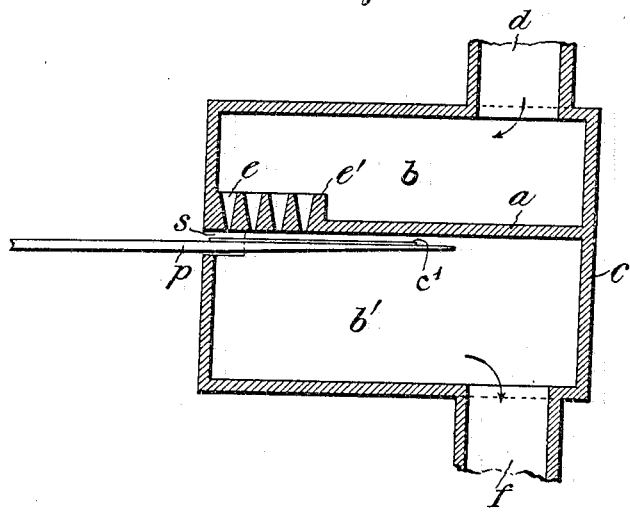
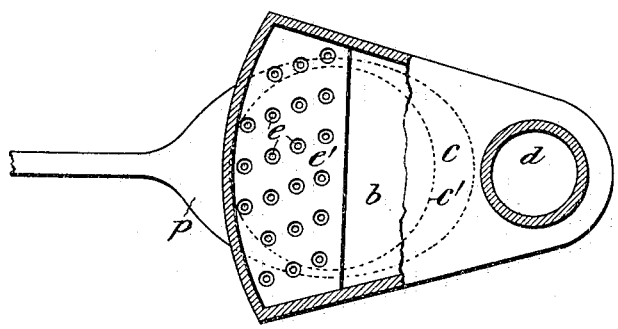
Witnesses:
Inventor:
Carl August Meurell.

No. 769,445. Patented September 6, 1904.

UNITED STATES PATENT OFFICE.

CARL AUGUST MEURELL, OF SÄTER, SWEDEN.

BREAD-FORMING MACHINE.

SPECIFICATION forming part of Letters Patent No. 769,445, dated September 6, 1904.

Application filed May 5, 1904. Serial No. 206,506. (No model.)

*To all whom it may concern:*

Be it known that I, CARL AUGUST MEURELL, a subject of the King of Sweden and Norway, residing at Säter, Sweden, (whose post-office address is Säter, Sweden,) have invented certain new and useful Improvements in Bread-Forming Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to machines designed for use in the manufacture of bread, and more particularly to the manufacture of what is known as "Swedish health-bread," which is made in the form of thin cakes, the dough being spread out in a thin layer upon a flour-dusted support and then dusted over with flour, pricked, cut into cakes, the excess of flour previously dusted or scattered thereon removed, and baked. In the manufacture of this particular kind of bread the proportions of water and flour or meal are of importance, as the greater the proportion of water, within certain limits, the crisper the bread. Hence the dough when made up is comparatively thin and very difficult to roll out into a thin cake of as nearly uniform thickness as possible, and this, as well as the other operations above referred to, have before my invention been effected by hand, involving a great deal of time and patient labor.

Means for spreading the dough into a thin layer of as nearly a uniform thickness as possible, means for pricking the layer of dough, and means for slicing or cutting up said layer into cakes of suitable or desirable size for handling and packing, and even means for removing the superfluous flour sprinkled on the layer of dough while being spread out may be combined in one machine in bakeries where the output is sufficiently large to admit of the use of a table of sufficient dimensions to provide the necessary space for the application of the various appliances; but where the output is small it will be preferable to use separate apparatuses for performing the functions above referred to.

This invention relates more particularly to appliances for removing surplus flour adhering to the cakes or sections of dough before baking, said cakes or sections being cut from a sheet of dough formed on a circular or annular rotatable table combined with means for scattering flour onto the table and onto the sheet of dough as it is formed thereon, which sheet of dough is then pricked or punctured and then cut up by appliances forming the subjects-matter of applications for patents filed of even date with this.

In the accompanying drawings, Figure 1 is a vertical longitudinal section, and Fig. 2 a sectional plan view of apparatus embodying my invention.

The apparatus consists, essentially, of a box or casing $c$ of substantially triangular form in plan, Fig. 2, and divided into upper and lower chambers $b$ and $b'$, respectively, by a partition $a$, having a raised portion $e'$ at its wider end with apertures the cross-sectional area of which is preferably gradually decreased from the inlet to the outlet—*i. e.*, from their upper to their lower ends—to form blast-nozzles $e$.

The upper chamber $b$ is connected at its narrower end to a pipe $d$, connected to an air-forcing appliance or to any other appliance by means of which air under pressure may be supplied to said chamber $b$, which appliance is not shown in the drawings on the ground that such appliances are well-known and commonly used in the arts. At its narrower end the lower chamber $b'$ is connected to an exhaust-pipe $f$, which may be connected to any suitably-constructed collector for collecting the flour removed from the cakes of dough, and at its wider end, below the nozzle portion $e$ of the partition $a$, the end wall of the casing $c$ is slotted, as shown at $s$, Fig. 1, for the introduction of a peel $p$, on which one or more cakes or sections of dough are placed.

It will readily be seen that the blast of air issuing from nozzles $e$ impinges upon and sweeps over the cake $c'$ of dough, (shown in Fig. 1 and in dotted lines in Fig. 2,) and thus blows away any excess of flour that has been scattered over it, and when one side of the cake is thus freed from the excess of flour the said cake can be turned and the other side thereof similarly acted on by the air-blast, though this is hardly necessary, because, as a rule, only sufficient flour is scattered upon the table on which the sheet of dough is formed to prevent its sticking thereto. When so freed from the excess of flour, the cake of dough can at once be introduced into an oven or it may be set aside until a sufficient number of cakes to fill an oven have been treated.

Having thus described my invention, what I claim as new therein, and desire to secure by Letters Patent, is—

1. Apparatus such as described, comprising a casing divided into upper and lower chambers, by a partition having blast-openings through it at one end, a slot in the casing at said end of and below said partition, for the introduction of a peel, and suction and blast pipes opening, respectively, into the lower and upper chambers at the end of the casing opposite the aforesaid slot, for the purpose set forth.

2. Apparatus such as described, comprising a casing narrower at one end than at the other, a partition dividing said casing into upper and lower chambers, provided with rows of blast-openings in its wider portion, a slot in the wider end wall of the casing below the partition for the introduction of a peel, and suction and blast pipes communicating respectively with the lower and upper chambers at their narrower end, for the purpose set forth.

3. Apparatus such as described, comprising a substantially triangular casing in plan, a partition dividing said casing into upper and lower chambers, said partition having a plurality of nozzle-shaped openings at its wider end, a slot in the wider end wall of the casing below the partition, an exhaust-pipe at the narrower end of said casing opening into the lower chamber thereof and a blast-pipe at the same end of the casing opening into the upper chamber thereof, for the purposes set forth.

In testimony that I claim the foregoing as my invention I have signed my name in presence of two subscribing witnesses.

CARL AUGUST MEURELL.

Witnesses:
L. KALLENBERG,
HARRY FR. ALBIKU.